United States Patent
Kiraly et al.

(10) Patent No.: US 8,951,138 B2
(45) Date of Patent: Feb. 10, 2015

(54) GOLF CLUB HEAD MEASUREMENT SYSTEM

(71) Applicant: WAWGD, Inc., San Diego, CA (US)

(72) Inventors: Chris Kiraly, San Diego, CA (US); Paulo Merloti, San Diego, CA (US)

(73) Assignee: WAWGD, Inc., San Diego, CA (US)

( * ) Notice: Subject to any disclaimer, the term of this patent is extended or adjusted under 35 U.S.C. 154(b) by 115 days.

(21) Appl. No.: 13/745,775

(22) Filed: Jan. 19, 2013

(65) Prior Publication Data

US 2013/0190098 A1    Jul. 25, 2013

Related U.S. Application Data

(60) Provisional application No. 61/590,638, filed on Jan. 25, 2012, provisional application No. 61/590,685, filed on Jan. 25, 2012.

(51) Int. Cl.
*A63B 69/36* (2006.01)

(52) U.S. Cl.
USPC .......................................... 473/222; 473/223

(58) Field of Classification Search
USPC .................. 463/31–42; 473/409, 222, 223
See application file for complete search history.

(56) References Cited

U.S. PATENT DOCUMENTS

| | | | | |
|---|---|---|---|---|
| 8,210,960 B1 * | 7/2012 | Davenport | | 473/223 |
| 8,221,257 B2 * | 7/2012 | Davenport | | 473/223 |
| 8,425,340 B2 * | 4/2013 | Davenport | | 473/223 |
| 8,550,939 B2 * | 10/2013 | Ueda et al. | | 473/409 |
| 8,556,267 B2 * | 10/2013 | Gobush | | 273/317.2 |
| 2003/0130054 A1 | 7/2003 | Bissonnette et al. | | |
| 2006/0247070 A1 | 11/2006 | Funk et al. | | |
| 2011/0028248 A1 | 2/2011 | Ueda | | |
| 2011/0305369 A1 | 12/2011 | Bentley et al. | | |

FOREIGN PATENT DOCUMENTS

KR    10-2009-0105031 A    10/2009

OTHER PUBLICATIONS

International Search Report and Written Opinion issued in PCT/US2013/022420 on Jun. 25, 2013.

* cited by examiner

*Primary Examiner* — Masud Ahmed
(74) *Attorney, Agent, or Firm* — Manuel de la Cerra

(57) ABSTRACT

This disclosure describes a method for measuring the path and orientation of a golf club during a swing. Of particular interest is the orientation of the club face and its path prior to, at and just after impact with the ball. Golfers and club manufactures are interested in this information for swing improvement and club design. The key measurements are the face orientation and path relative to the ball, these are: horizontal path, vertical path, face open/close, face loft, face lie and ball impact position on the face. The disclosure additionally defines a means for accurately measuring the orientation of the club head and shaft throughout the entire swing. The technique may use an inertial navigation system attached to the head or shaft in conjunction with the camera system. An important feature of the method is the ease of use in that it provides accurate results without complex calibration procedures.

24 Claims, 11 Drawing Sheets

GOLF CLUB HEAD MEASUREMENT SYSTEM

CLAIM OF PRIORITY

This application claims priority to U.S. provisional application No. 61/590,638, entitled "Golf Club Head Measurement System", which was filed on Jan. 25, 2012. This application also claims priority to U.S. provisional application No. 61/590,685, entitled "Golf Club Head Measurement System", which was filed on Jan. 25, 2012. Both of these applications are incorporated herein by reference.

TECHNICAL FIELD

This invention relates to a golf club measurement systems. More particularly, the invention relates to devices and processes for efficiently measuring the dynamic path, impact location of golf ball on the club face and orientation of a golf club head and shaft during a golf swing.

BACKGROUND

In the game of golf, knowing the dynamics of the club head and shaft during the swing is useful for equipment design, practice and instruction. Those characteristics include the club head speed, club head orientation, contact point of the ball on the club face and swing path. As is apparent from this list, the angle, position and speed of the club head as it impacts the ball is critical to the ultimate golf ball trajectory.

To address this problem, previous systems have used multiple cameras and reflective spheres such as the system shown in FIG. 8. Relatively large round reflective spheres 805 are attached to the head 810 and shaft 815 of the club. The markers protrude from the head and shaft and can be easily damaged or have adverse effect on the golfers swing. The spheres although light are not insignificant and can affect the weight and aerodynamics of the swing. The spheres also prevent the club from being inserted into a golf bag. Initially these spheres have no known relationship to the club face. A complicated procedure using a calibration fixture is required to determine the relationship between the arbitrary spheres and the club face.

What is needed is a system that is easy to install, does not require calibration, and does not adversely affect or influence a golfer's swing.

SUMMARY OF THE INVENTION

Disclosed herein is a system and method for measuring a golf club head during a swing. The system has at least three markers placed on the club face, the marker placement defining the geometry of the club face without further calibration, and conforming to a known tolerance (or rule set) of relative spacing and orientation between the markers. The system can use these markings, which do not need to be applied with great precision to calculate the club head position throughout the swing and at impact with a golf ball. Using at least two cameras, images are captured of the golf club face during a swing and those images are feed to a processor that performs several image processing steps to calculate the desired parameters. Those steps include performing threshold processing on the images to detect pixels that may correspond to the markers, determining a position for the markers in three dimensional space, finding a group of markers that fall within the tolerance of a known geometric relationship, labeling the markers based on their position with respect to the known geometric relationship, and calculating the position of the club head during the swing based on the 3D position of the markers.

In one embodiment, the system has four markings on the club face placed at the TOE TOP, TOE, TOE BOTTOM and HEEL positions. D1 is a line connecting the HEEL and TOE markers, D2 is a line connecting the TOE TOP and TOE markers, and D3 is a line connecting the TOE BOTTOM to TOE markers. In this embodiment, the known tolerance of relative spacing and orientation between the markers conform to the following rule set: (i) D1 has and minimum and maximum known lengths for standard golf clubs; (ii) D1 is always longer than D2 and D3; (iii) D1 is substantially closer to horizontal relative to the ground than vertical at impact with a golf ball; (iv) the TOE TOP marker is above D1 at impact; (v) the TOE BOTTOM marker is below D1 at impact; and (vi) all markers lie substantially in the same plane.

In yet another embodiment, the processor identifies groups of neighboring pixels, performs a centroid algorithm on the pixels and matches the pixels detected to determine a position for the markers in three dimensional space.

In another embodiment the system also determines the position of the golf ball in three dimensional space before impact, and may optionally alert the user that the system has located the golf ball. From the ball location, the processor can further calculate the position on the club face where the club face and ball first come into contact. The processor can also calculate the swing path, club speed, club face orientation and position of the club face at impact with the golf ball. Those calculated attributes of the club head can be displayed on a display that can be a part of the system.

In yet another embodiment, the system automatically stops capturing images at the point of impact or at some predetermined time after impact. Unique markers may be applied to the golf club and the system may determine what type of club is use based on the identification of the unique markers.

The system may also use an inertial navigation system on the golf club and with the inertial data from the inertial navigation system the processor refines the golf club head measurements by converting the inertial data to rotation and translation values of an inertial coordinate frame, converting the club face position data to rotation and translation values of a club face coordinate frame, and determining a relationship between the inertial coordinate frame and the club face coordinate frame. This relationship may be determined by using a method for solving an overdefined system of equations. The relationship between the club face coordinate frame and the inertial coordinate frame may be used to calculate the club face position and orientation when at least one of the markers, or all of the markers are not in the field of view of the cameras. Knowing the relationship between the inertial navigation system and the shaft axis further allows the system to calculate the position of the club shaft. The system can also display a 3D model of the golf club throughout at least a portion of the swing, even for portions of the swing where the club face is out of the view of the cameras.

The system may also have a tilt gauge that measures the position of the cameras relative to earth tangential, and this data can refine the golf club head measurements.

In a separate embodiment, a method is disclosed for measuring a golf club head. The club head is marked by applying at least three markers placed on the club face, the marker placement is such that (1) the markers define the geometry of the club face without further calibration, and (2) the markers' relative spacing and orientation to each other are within a known tolerance. The method can use these markings, which do not need to be applied with great precision to calculate the club head position throughout the swing and at impact with a golf ball. The method includes capturing a plurality of images from at least two cameras of the golf club face during a swing and performing threshold processing on the images to detect pixels that may correspond to the markers, determining a position for the markers in three dimensional space, finding a group of markers that fall within the tolerance of a known geometric relationship, labeling the markers based on their position with respect to the known geometric relationship, and calculating the position of the club head during the swing based on the 3D position of the markers.

In one embodiment, the method uses four markings on the club face placed at the TOE TOP, TOE, TOE BOTTOM and HEEL positions. D1 is a line connecting the HEEL and TOE markers, D2 is a line connecting the TOE TOP and TOE markers, and D3 is a line connecting the TOE BOTTOM to TOE markers. In this embodiment, the known tolerance of relative spacing and orientation between the markers conform to the following rule set: (i) D1 has and minimum and maximum known lengths for standard golf clubs; (ii) D1 is always longer than D2 and D3; (iii) D1 is substantially closer to horizontal relative to the ground than vertical at impact with a golf ball; (iv) the TOE TOP marker is above D1 at impact; (v) the TOE BOTTOM marker is below D1 at impact; and (vi) all markers lie substantially in the same plane.

In yet another embodiment, the method include the additional steps of identifying groups of neighboring pixels, performing a centroid algorithm on the pixels, and then stereoscopically matching the pixels detected to determine a position for the markers in three dimensional space.

Other systems, methods, features and advantages of the invention will be or will become apparent to one with skill in the art upon examination of the following figures and detailed description. It is intended that all such additional systems, methods, features and advantages be included within this description, be within the scope of the invention.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It may be understood that certain components and details may not appear in the figures to assist in more clearly describing the invention.

DETAILED DESCRIPTION

The proposed system uses markers that are small and do not significantly affect the golfer or the club weight. The markers are applied to the face such that they define the face geometry without extra calibrations steps. The markers are imaged with a stereoscopic camera system during take away and just prior to club-ball impact. No library of marker relationships is necessary, making it easy to mark and use any club without prior calibration. The proposed system also uses an inertial navigation system attached to the club head, shaft or grip that measures club orientation when the markers are out of the cameras' field of view. The method takes advantage of the known club head orientation when the golf club is in the camera system field of view such as at addresses, at take away and just prior to ball impact to determine the relationship between the club and an inertial navigation system attached to the shaft, grip, hosel or head of the club. If the club head leaves the field of view of the cameras the inertial navigation system provides information about club position relative to known positions provided by the camera system.

6.1 Configuration of the Camera System

Figure 1:
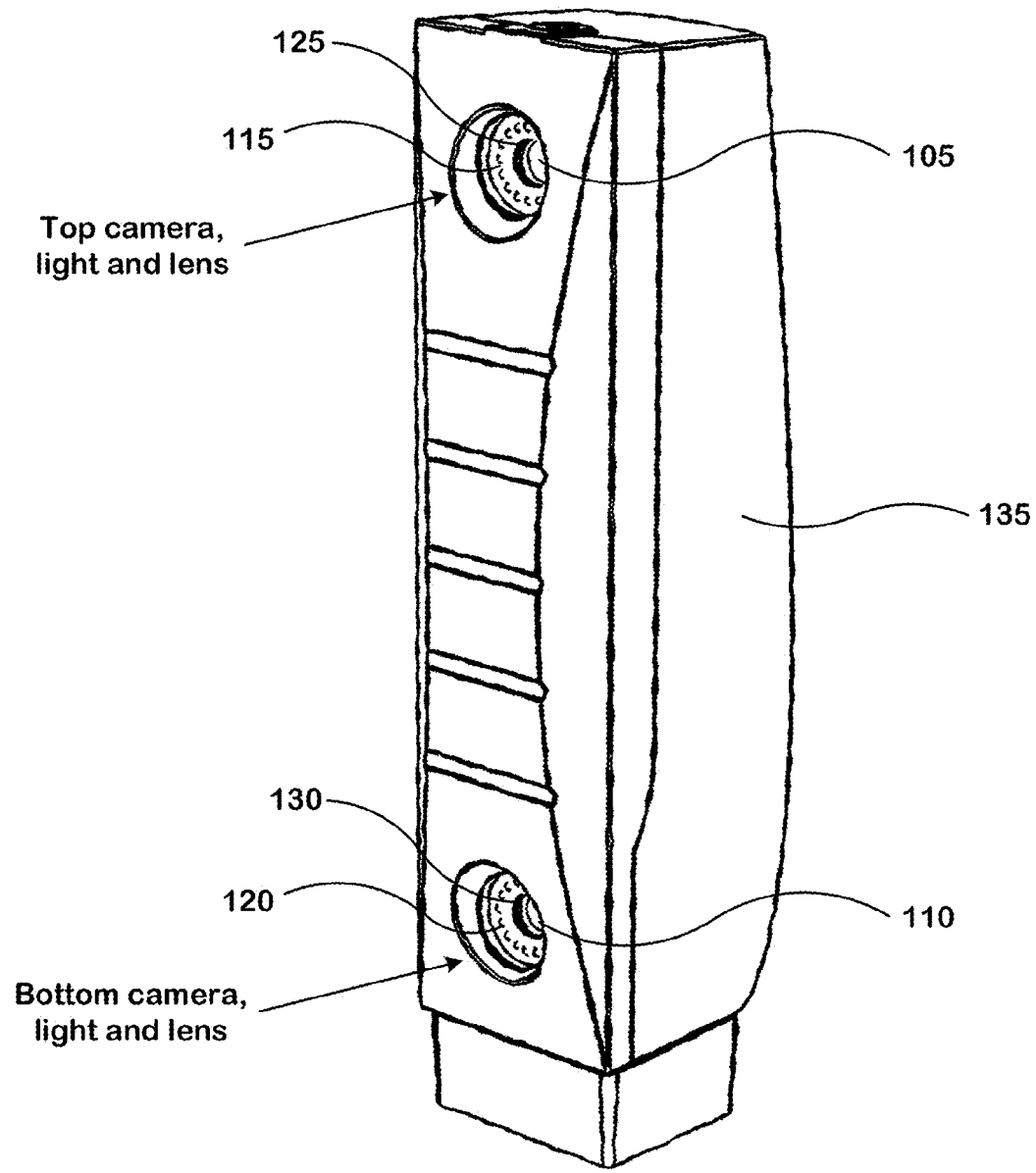
FIG. 1 is a preferred embodiment of a novel stereoscopic club head measurement system.
Figure 2A:
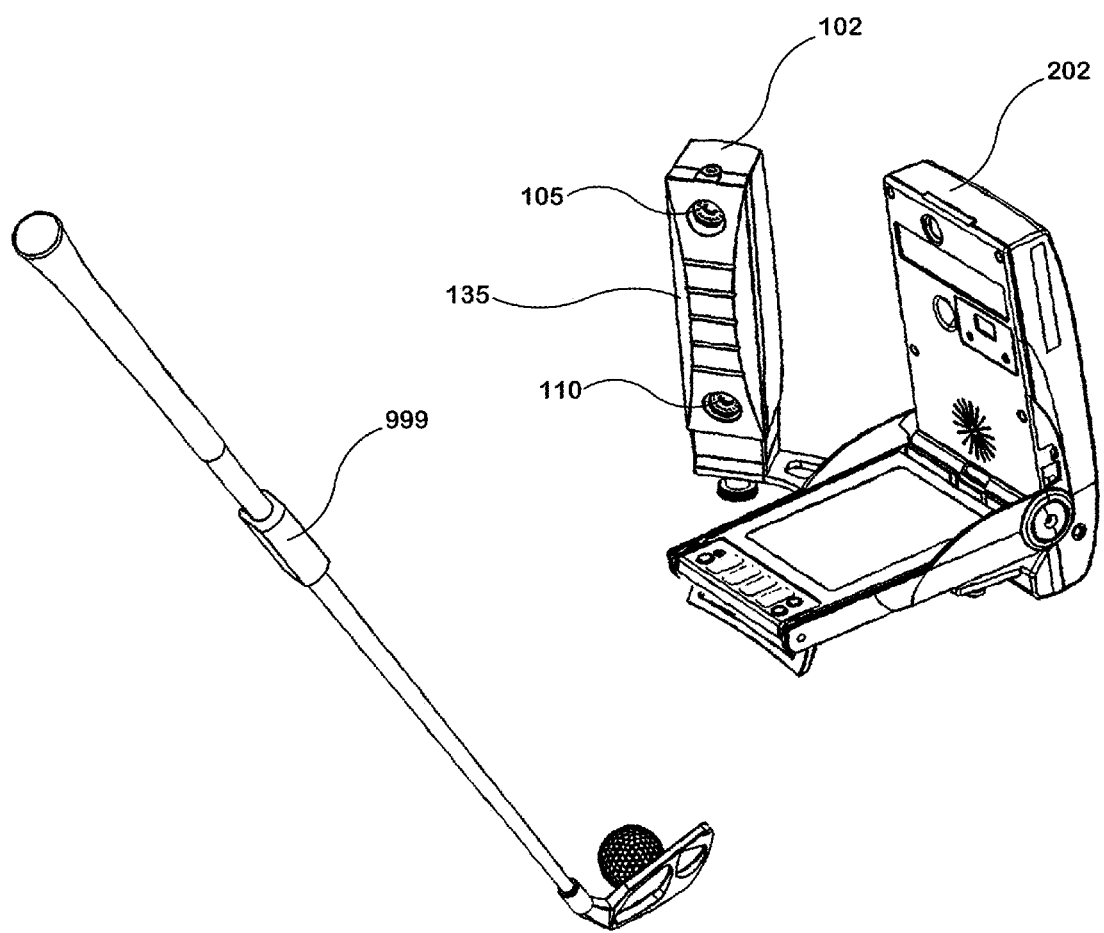
FIG. 2A illustrates the novel stereoscopic club head measurement system used with a golf ball measurement system.

The system uses two or more cameras that are calibrated such that the orientations of the cameras are known to each other allowing for stereoscopic measurements. Stereoscopic measurement provides accurate 3D measurement in the calibrated 3D view volume as is well known to those skilled in the art. FIG. 2A shows a golf club measurement system 102 with two cameras (105 and 110), lights (115 and 120) and lenses (125 and 130) in a protective enclosure 135. In the preferred embodiment the lights (115 and 120) are arranged in a radial pattern around the lenses (125 and 130) for optimal illumination of the retro-reflective marks as described in the section 6.4 below.

Figure 2B:
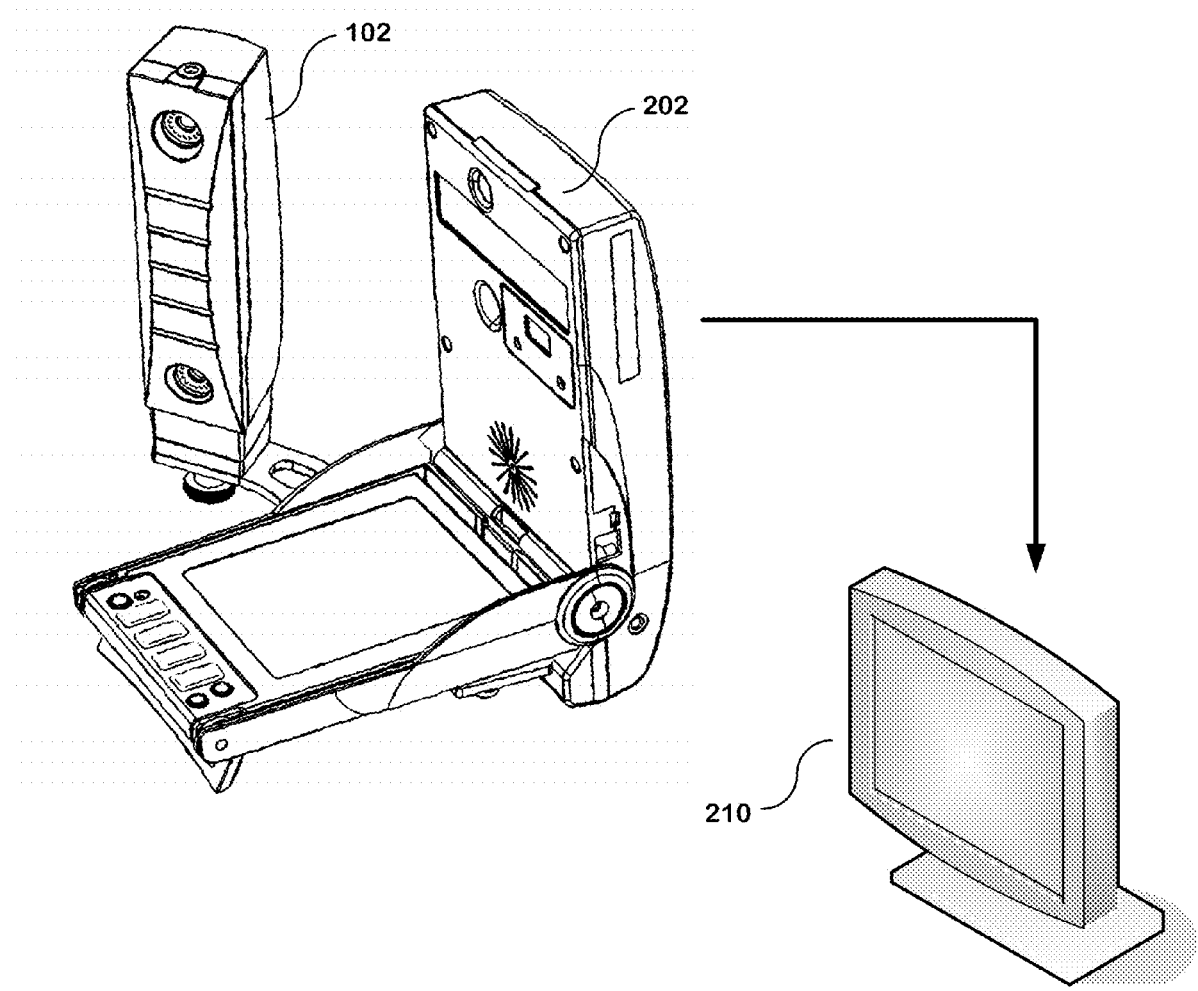
FIG. 2B is a close up view of the two systems shown in FIG. 2A.

This golf club measurement system 102 may be used alongside a golf ball measurement system 202 and shown in FIGS. 2A and 2B. Such a ball measurement system may include U.S. Pat. No. 7,641,565, U.S. Pat. No. 7,497,780 and U.S. Pat. No. 7,540,500 invented by the same inventor of the present application. The contents of these patents are incorporated herein by reference. In the configuration shown in FIG. 2A, the ball system 202 works in conjunction with the club measurements system 102. The ball system 202 commands the club measurement system 102 to start and stop recording as well as collects images and computes the results. Other configurations are possible without the ball measurement system 202 or by combining the ball and club systems into a single pair of cameras. In the example of the preferred embodiment using two cameras shown in FIG. 2A, the ball system 202 is shown in its preferred position, slightly ahead but off to the side to avoid impact by the ball. FIG. 2B is a close-up view of club head measurement 102 cameras shown with ball measurement system 202.

FIG. 2B also illustrates that the measurement system may be connected to an external display 210 that can display to a user the calculations performed by the measurement systems 102 and 202. Alternatively the data from these systems can be feed into a computer for further analysis or, for example, use in video gaming.

6.2 Marking the Club

Figure 3A:
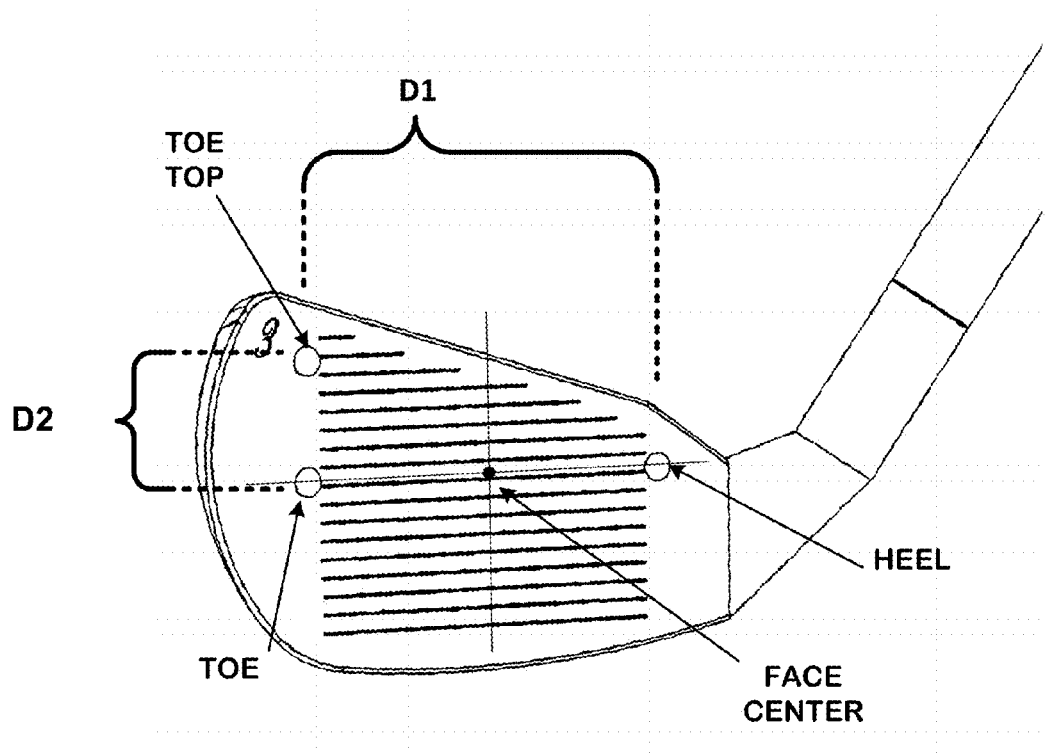
FIG. 3A illustrates a novel and preferred three marker geometry relative to the club face.

The club is marked with at least three contrasting markers that allow the golf club measurement system to determine the club geometry without special calibration. The markers are applied directly on the club face to make it easy to align the markers to the features that are to be measured. Additionally, the markers are placed with generally the same known orientation to the club and spacing relative to each other, and within a known tolerance range such that this geometry can be identified during processing. In the preferred embodiment two of the three markers are always placed around the center point of the club and horizontally spaced along the face. The user will be instructed to place the markers near the TOE and HEEL of the club face and centered on the same score line for easy and accurate alignment. Based on this placement requirement and knowing there is a limited size range of a golf club face a spacing range is established. In addition to the TOE and HEEL markers at least one additional marker is place to allow the system to be able to identify the plane of the club face. Again, the user is instructed to place this in generally the same location for all clubs with respect to the TOE and HEEL markers. For example we will place this third marker generally above the TOE marker and call it TOE TOP. Based on the limited size of a club face the distance from the TOE marker to the TOE TOP marker will have a minimum and maximum range. This marker layout is shown in FIG. 3A.

Based on a known and limited range of club geometries, placing the markers as defined above defines a known tolerance (set of rules) for locating and identifying the three marker group. Based on the placement and typical club geometry the three markers as a group generally form a shape that resembles a capital "L" lying down. Defining D1 as the line connecting the HEEL and TOE markers and D2 as the line connecting the TOE TOP and TOE marker, the following rule set may define the relative orientation and spacing of the markers:

The distance D1 shall have a minimum and maximum range for standard golf clubs.
The distance D1 is always greater than D2.
The line formed between TOE and HEEL is generally closer to horizontal (ground plane) than vertical.
TOE TOP is above a line drawn from TOE to HEEL.

When these three markers are identified using these known tolerances or rules, the markers can be labeled during processing and used to calculate all the club parameters.

Figure 3B:
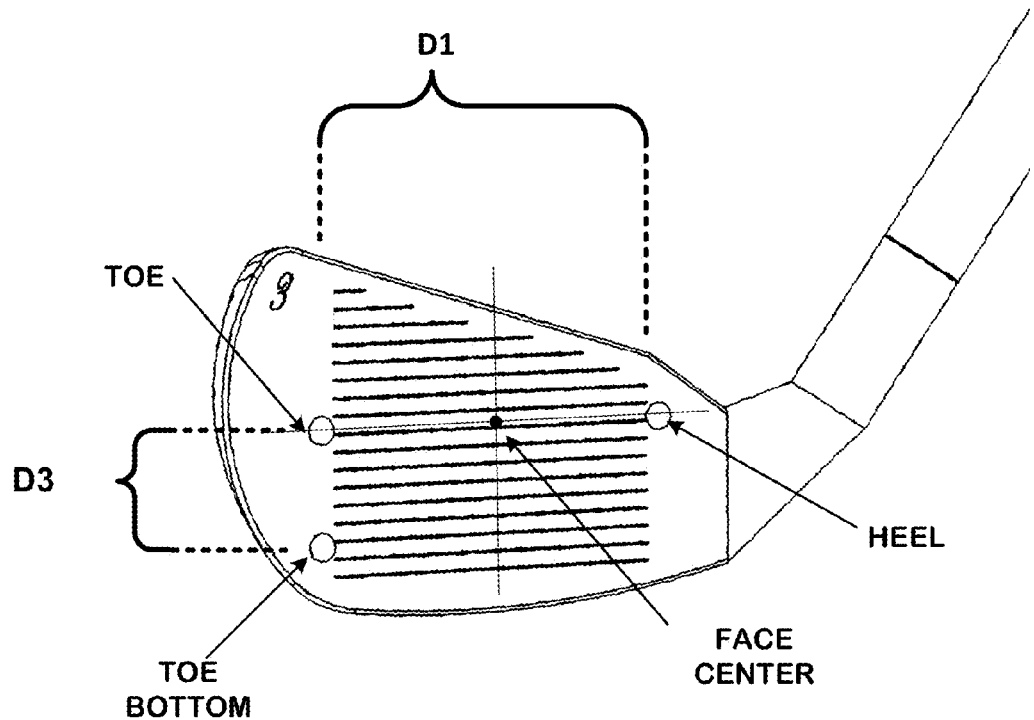
FIG. 3B illustrates another novel and preferred three marker geometry relative to the club face.

FIG. 3B shows another marker layout with the capital "L" flipped—i.e., the TOE TOP marker is replaced with a TOE BOTTOM mark. Defining D1 as the line connecting the HEEL and TOE markers and D3 as the line connecting the TOE BOTTOM and TOE marker, the following rule set may define the relative orientation and spacing of the markers:

The distance D1 shall have a minimum and maximum range for standard golf clubs.
The distance D1 is always greater than D3.
The line formed between TOE and HEEL is generally closer to horizontal (ground plane) than vertical.
TOE BOTTOM is below a line drawn from TOE to HEEL.

Again, based on the known and limited range of club geometries and the known relative orientation and spacing between the markings, the system can process the images of the club to determine several club face parameters.

Figure 3C:
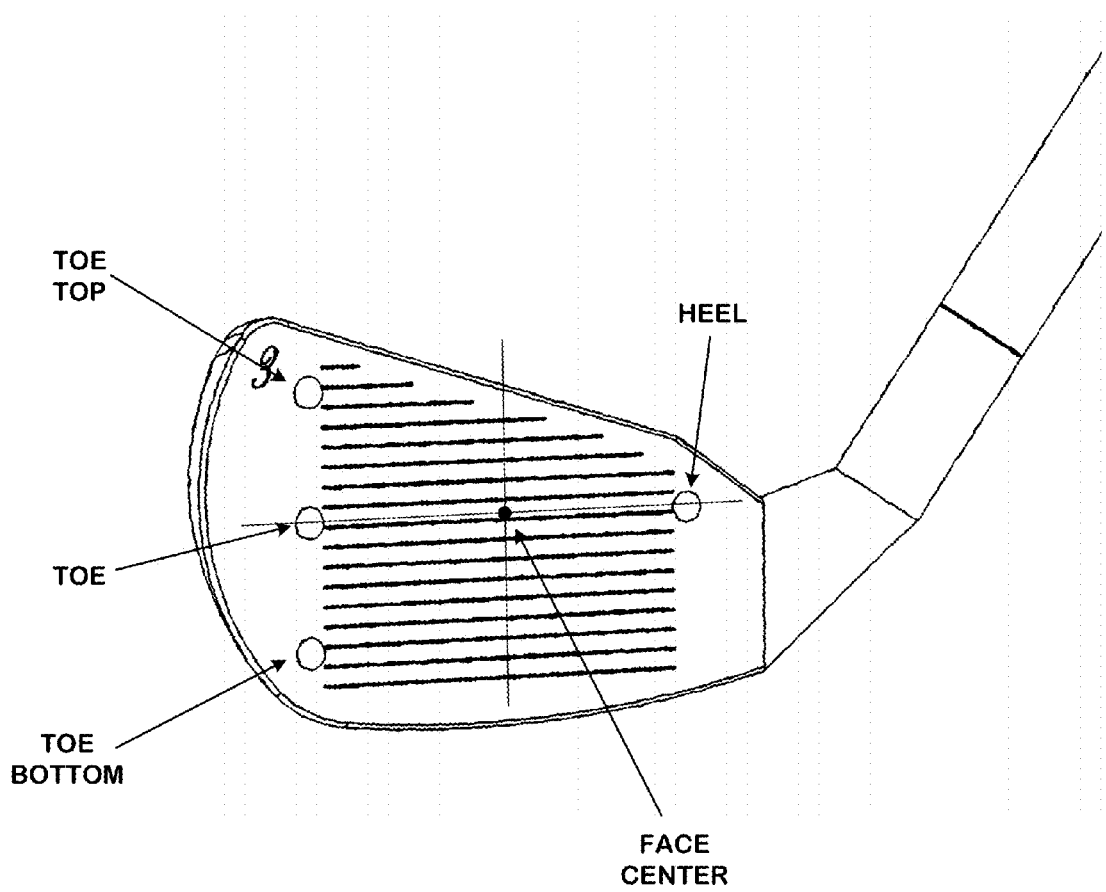
FIG. 3C illustrates a novel and preferred four marker geometry relative to the club face.

It should be clear to someone skilled in the art that other marker geometries are possible that still yield the same results. It is also understood that additional markers can be added to enhance the measurement accuracy using fitting or ease in marker group identification. For example, in a preferred embodiment a four marker system is describe since it strikes a balance between ease of marking and accuracy in determining the plane of the club face. FIG. 3C illustrates the relative positions of the club markings The TOE and HEEL markers are placed such that they directly define the vertical center and club lie angle, club score lines may be used to aid in aligning these markers. The point between the TOE and HEEL markers defines the club center. The TOE TOP and TOE BOTTOM are used in conjunction with the TOE and HEEL to determine the plane of the face. The TOE TOP and TOE BOTTOM do not require precise location but maximizing their vertical separation improves measurements associated with face angle. This is the preferred marking technique but other marker arrangements consisting of one or more markers on the face may be used. When results are displayed, ball impact is rendered relative to marker locations shown to scale on a club face model. This ensures that even if the user does not place the markers around the true club center they still get a meaningful relative impact position.

In order for the golf club measurement system to make the required measurements the system must identify and label each of the markers as it relates to its position on the club. For example, to compute club lie, the system must extract information from the TOE and HEEL markers and will get the wrong results if it uses the HEEL and TOE BOTTOM instead. To accomplish this, the markers are placed such that they have a known geometry relative to each other. This geometry need not be precise and will change for different sized clubs, but the markings should have a consistent and known set of geometric relationships. By using these known geometric relationships the golf club measurement system can identify and label each marker on the club face prior to any measurements. It also uses this information to eliminate any false detection of markers due to reflections of ambient light sources.

Figure 4:
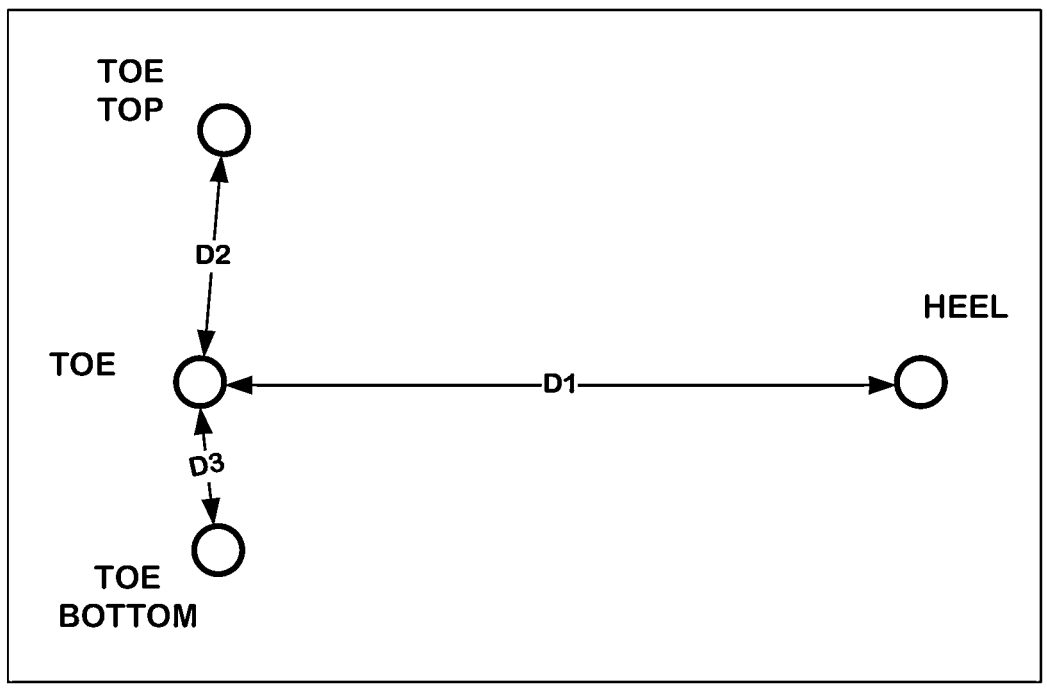
FIG. 4 illustrates the novel and preferred marker geometry relative to the other markers.

The relative marker placement geometry for the preferred four marker embodiment is shown in FIG. 4, other geometries and rules are possible as described above. Rules for club marker geometry of FIG. 4 include:

The distance D1 shall have a minimum and maximum range for standard golf clubs.
The distance D1 is always greater than D2 and D3
The line formed between TOE and HEEL is generally closer to horizontal (ground plane) than vertical.
TOE TOP is above a line drawn from TOE to HEEL.
TOE BOTTOM is below a line drawn from TOE to HEEL.
All markers are in a plane or nearly a plane for bulged faces

6.3 Computation of Camera Data

Figure 5A:
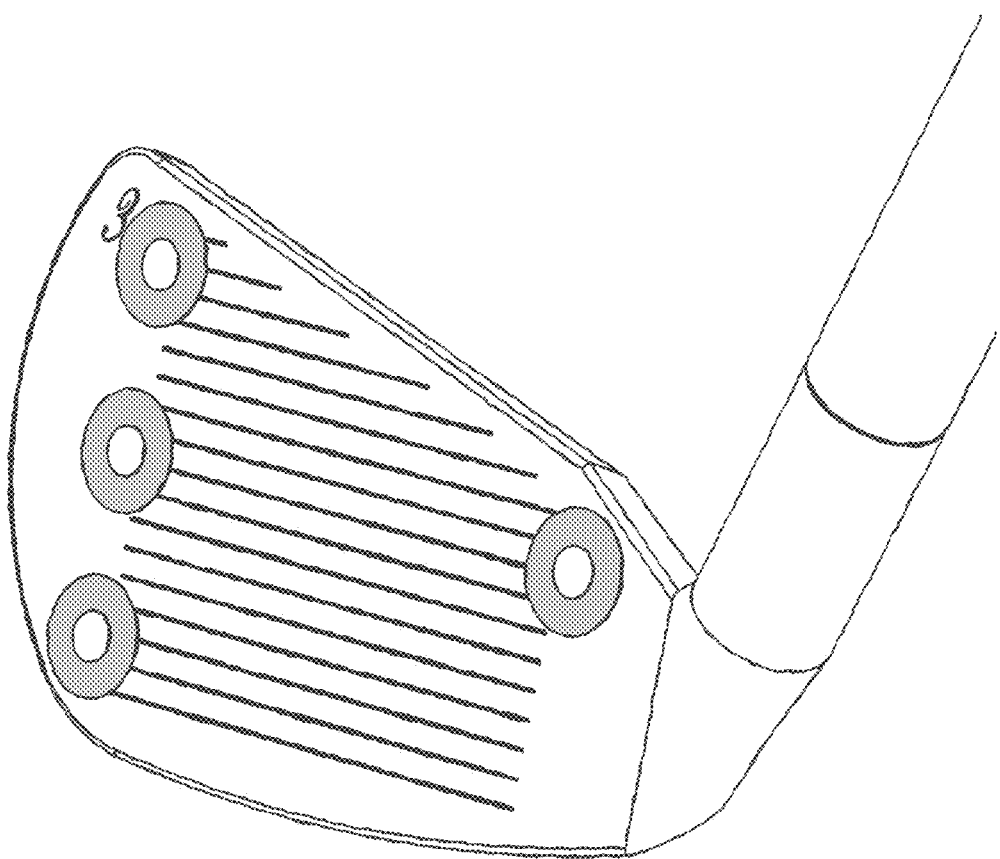
FIG. 5A shows markers placed on a club face, wherein the marker has a concentric contrasting ring.
Figure 5B:
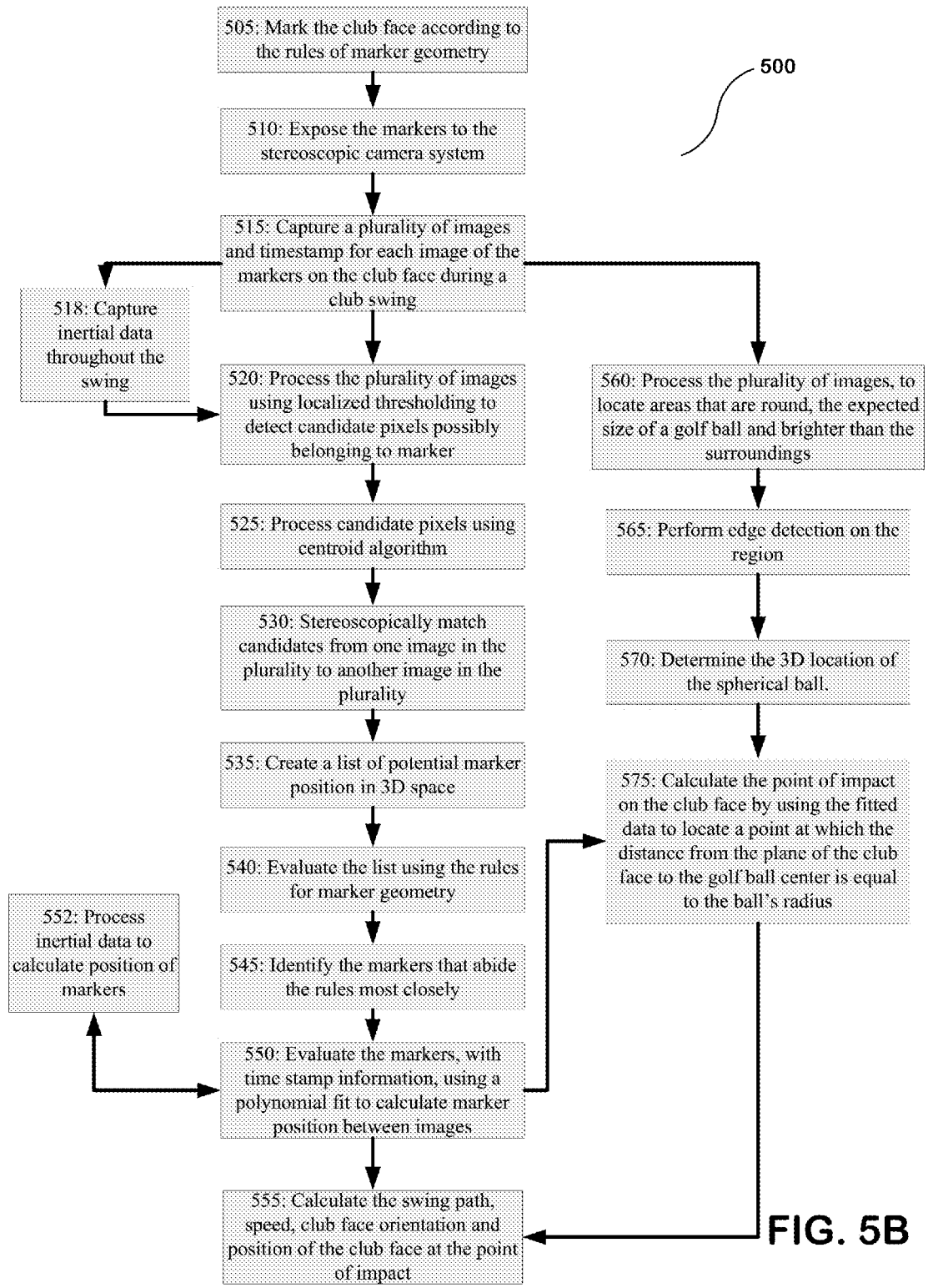
FIG. 5B is a flow chart showing the method for processing data.

FIG. 5B illustrate the method 500 to process the images with the markers. First at step 505, the club face is marked with markers according to the rules of geometry disclosed above. Then at step 510, the club face with the markers is exposed to the stereoscopic camera system during, for example, a club swing. The stereoscopic cameras capture a plurality of time stamped images during the swing (step 515). Optionally, and as discussed in more detail below in section 6.9, an inertial navigation system may be attached to the club shaft and can provide data regarding the relative changes in position of the club shaft. This data may be recorded and also processed by the system at step 518.

Since the markers are designed to have maximum contrast from its surroundings, standard localized thresholding is used to detect and isolate groups of pixels possibly belonging to the markers, groups are further qualified based on expected marker size (step 520). Then at step 525, candidate markers are processed using standard centroid algorithm to locate the center more accurately. Each possible 2D marker found in one image is then stereoscopically matched to all possible markers of the other image at step 530. Any points that do not form a good three-dimensional solution using standard stereoscopic algorithms are eliminated and the remaining 3D points form a list of possible 3D marker positions at step 535. The candidate 3D marker positions are then evaluated at step 540 based on the geometric rules listed above to identify the group of markers that most closely meets the expected geometry (step 545). Each of the 3D positions along with the time stamps are fit in 3D space using a polynomial fit to reduce noise and allow for calculation of marker position between images (step 550). The system may optionally use the inertial data from step 518 to calculate the position of the markers at step 552. This is discussed in more detail below in section 6.9.

Using the fitted marker information, the time at which the club contacts the ball is computed as described in section 6.7. With the contact time and fitted data for each marker, the method can at step 555 calculate instantaneous parameter such as swing path, speed, rotation rate or position at the point of impact.

6.4 Marking Types

In the preferred embodiment the markers are retro-reflective meaning that they reflect most of incident light back to the source. When the light source is placed close to the lens this type of marker requires significantly less light then other types of contrasting marks. A key aspect of the method described herein is to be able to reliably locate the markers in each image of the club. Under certain lighting conditions, specular reflections off the face can occur that make it difficult or impossible to locate the marker due to lack of contrast between the face and marker. To avoid this problem the preferred marker consists of a center with a contrasting concentric ring. In the preferred embodiment the center of the marker would be retro-reflective while the concentric ring would be matte black as shown in FIG. 5. When these markers are applied to the club face consistently with the rules laid out above, the golf club measurement system can use the images from the cameras and perform the computations to generate all the measurements as described in the previous section.

6.5 Use of Additional Markers without Special Calibration

When the club approaches the ball it is possible for the ball to occlude some of the markers on the face just prior to impact. Additionally, certain club face angles render it impossible to see the markers on the club face from the cameras' perspective during some portions of the swing. To alleviate this but still keep the calibration procedure simple, the method provides a mode that automatically determines the geometry of additional markers not placed on the face. In this mode additional markers are added to the club head, hosel or shaft such that they can be seen by the camera during, at and just after impact. The markers are placed non-precisely by the user at recommended locations. While at address, during take away or during approach and at impact, if one or more face markers as well as one or more additional markers are visible to the 3D camera system, a geometric relationship is formed and stored. This calibration is done in real-time and without knowledge of the user. Once the rigid body relationship is established, then any or all of the markers can be used to determine club dynamics, even if some of these markers are temporarily occluded.

6.6 Alignment of System to Golf Shot Target Line

Figure 6:
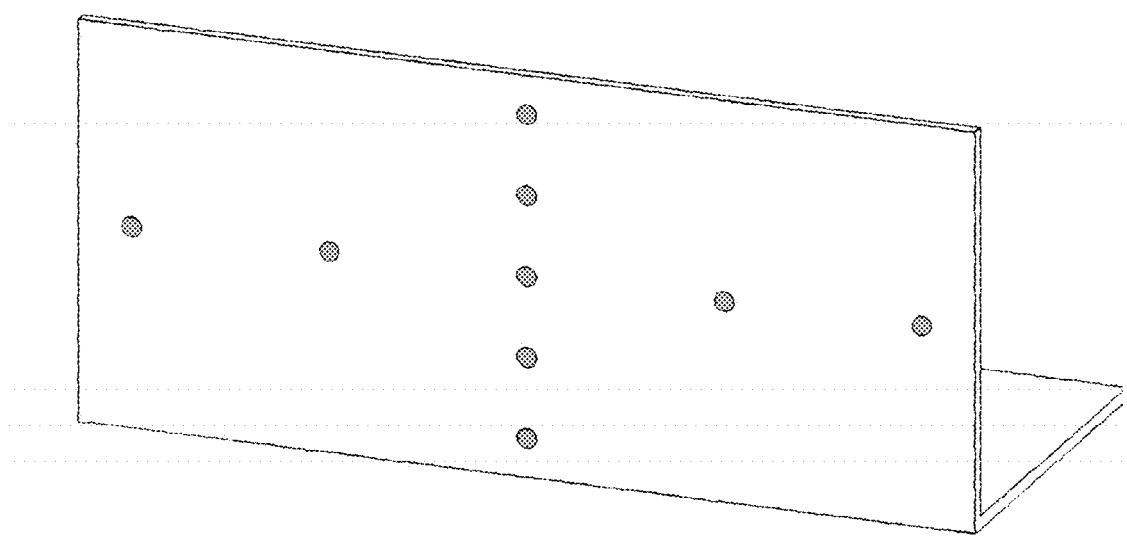
FIG. 6 illustrates a calibration device for use with the novel golf club head measurement system.
Figure 7:
FIG. 7 illustrates a club marked according to the method described herein, where the club also includes an inertial navigation system connected to the shaft.
Figure 8:
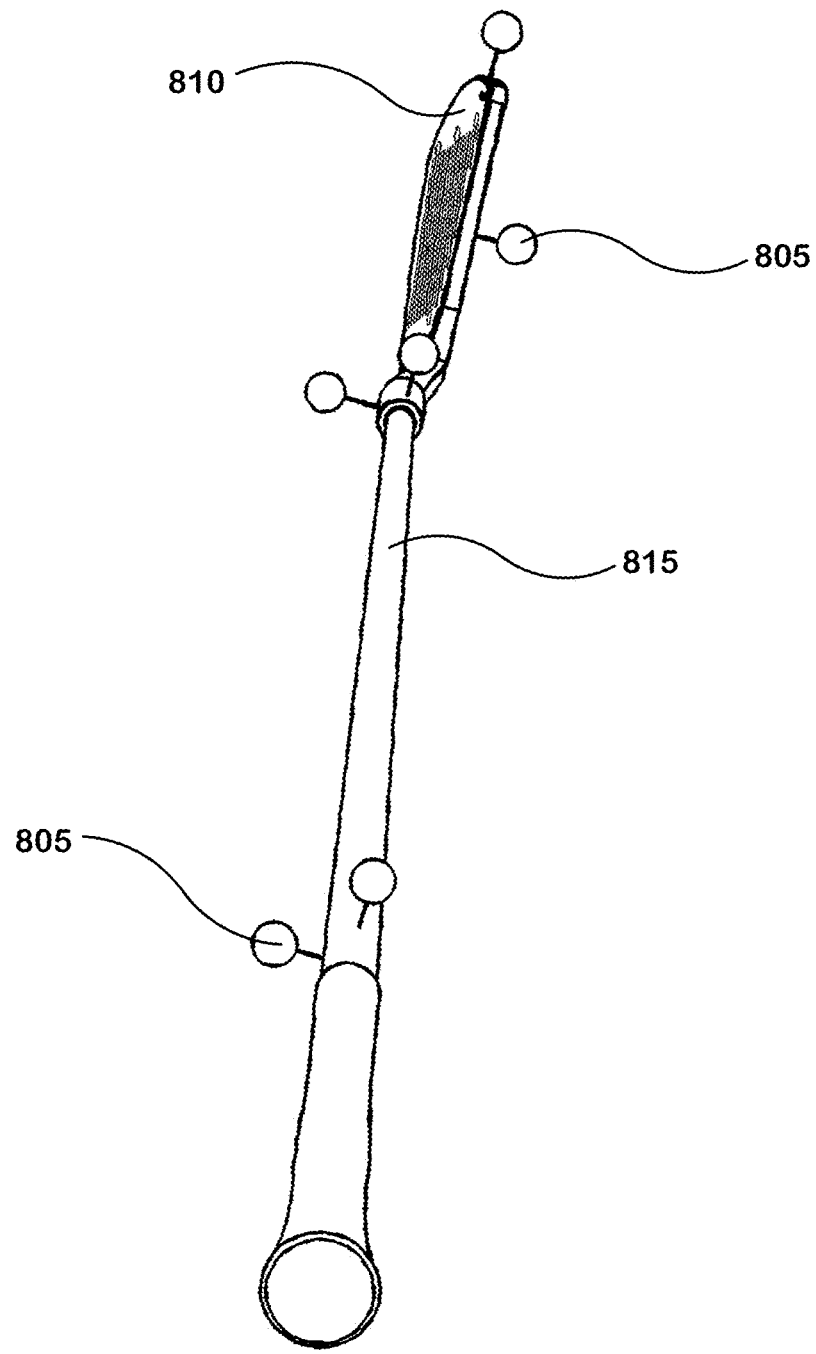
FIG. 8 is an example of prior art systems that use reflective spheres.

When measuring the golf club orientation, it is important to have a frame of reference. The golfer is typically interested in measurements relative to the intended shot target line. In the preferred embodiment, the system is pre-calibrated such that the camera system is aligned to the external enclosure. If the user desires to use the device without performing calibration they can simply line up the external enclosure of the device to the target line. For higher precision use as in a laboratory, a calibration target is used. The calibration target is a flat target with markers similar to or the same as the ones used on the club. Prior to use, the camera system images the target and locates a predetermined geometric pattern of markers. The markers are placed such that they define a 3 axis coordinate system as shown in FIG. 6. In this mode all values measured are relative to the target reference frame.

To facilitate ease of setup, an additional feature of the invention is the inclusion of a tilt gauge in the camera system enclosure that generates sensor angle information. The tilt sensor angle provides information regarding the orientation of the camera system relative to earth tangential (i.e., to a surface that is level relative to gravity) or other reference plane, and is useful for adjusting processor algorithms. The angular relationship between the tilt sensor and the camera system is measured and stored during a factory calibration procedure. During operation the user simply places the camera system onto a surface that may be uneven and hits shots using the front surface of the camera system enclosure as an alignment reference. By using the tilt sensor data, club orientation parameters can be produced that are relative to earth tangential.

6.7 Determining Ball Impact Location on the Club Face

One of the key parameters desired by golfers and golf club manufactures is the impact position of the golf ball on the golf club face. In order to know this relationship and to maintain ease of use, the preferred embodiment uses the stereoscopic cameras to measure the 3D position of the ball prior to impact. Using the ball position, club face orientation and club path, the system calculates the impact point of the ball on the club face.

The golf ball has a well-defined geometry and the camera system is setup such that it encourages the user to place the ball generally in the same position within the cameras' field of view. Golf balls are also generally white or some light color to make them easy to locate within the field of play. The stereoscopic camera system continuously captures images of the hitting area and runs algorithms to detect the precise 3D location of a ball placed in the hitting zone. To do this, the image from each camera is analyzed using standard image processing techniques. Turning to FIG. 5B, at step 560 the images are analyzed to locate regions that are generally round in shape, are of the expected size of a golf ball and are brighter than the surrounding background. Once the ball is located, at step 565 edge detection is used to precisely find the edge of the circular shaped ball. Then at step 570 the 3D location of the spherical ball is determined using standard stereoscopic techniques. At this point, the system may alert the user that the ball has been located with, for example an audio or visual alert. The user can then begin to swing the club and the system can track that movement.

By having established the precise 3D location of the ball prior to the swing, the system now finds the precise contact point of ball and club at impact at step 575. This is done by finding the makers in each of a series of time stamped stereoscopic images of the marked club face as it approaches the ball as described previously. Each marker is fit in time and space using a polynomial to reduce noise and to provide the ability to predict the markers' position at any time during the swing. A 3D plane is computed using marker positions allowing the face to be determined in 3D at any time within the camera systems' field of view. The computer uses the fitted data to iterate through locations near impact to find a point at which the distance from the plane of the face to the ball center is approximately equal to the ball's radius.

Once the system knows the ball has been impacted, it can direct the cameras to stop capturing images, or alternatively to stop after some pre-defined time period. Then the system may display the results of the swing to the user.

6.8 Determining the Club being Hit

For certain applications such as club fitting it is important to know exactly which club is being used. To do this, the markers can be placed with specific geometry that is unique to each club or additional markers can be added. Another method is to allow the user to place the markers randomly and then have the computer determine and store the exact geometry for each club. The accuracy of marker measurement along with the varied club geometry makes this a reasonable method to uniquely identify each club. If a new club is introduced to the system that has geometry that matches too closely to one in the library then the system could alert the user to manipulate the markers.

6.9 Club Tracking Throughout the Entire Swing, Even when Club Head is Out of View Another feature of the system is a method for measuring the entire club shaft and head throughout the entire swing. There are current systems that attach an inertial navigation system to the shaft to measure information throughout the swing. These systems can measure relative changes in translational and rotational motion but have no absolute frame of reference. When a golfer addresses the ball he or she may not position the club in a manner where the club head orientation is aligned the target line. Golfers tend to compensate for undesirable ball flight characteristics by adjusting swing alignment. When attached, the inertial navigation system orientation are not well known relative to the club head. However, with the club head and shaft in view at address, the initial state of the inertial measurement devices can be established relative to this reference frame. During the swing, the changes in the inertial measurements can be applied relative to the reference frame to accurately measure the position of the club head and shaft throughout the golf swing, even when the golf club is not in view of the cameras. The inertial data and image data may be computed in real-time or recorded and post processed, in the preferred embodiment all data is recoded and post processed.

While addressing the ball, the camera system measures the position of each marker while the club face is in the field of view. Using images and time stamps for each frame the system computes the position of each marker by fitting the point position versus time using a polynomial curve fit. During this same time the inertial navigation data has also been collected and this data is also fitted to the appropriate order polynomial to reduce noise. These two sets of data (i.e., the inertial and marker positions from the camera system) are now correlated to determine the inertial system orientation relative to the known accurate camera system data as described below.

To establish the relationship between the club face and inertial navigation system a transformation matrix is found between three coordinate frames. The first coordinate frame, "Golfers Frame" is that of the golfer that is defined by the earth tangential plane and the target line. The second coordinate frame, "Club Face Frame" is the coordinate frame of the club face with one axis formed by a line between the TOE and HEEL markers, a second axis normal to the plane of the face and a third axis normal to the previous two axes. The final coordinate frame is that of the inertial navigation system, "Inertial Frame". The relationship between the "Golfer's Frame" and the "Club Face Frame" has been previously established either by using the alignment to the system enclosure or the calibration target as previously described. To create a relationship between the "Club Face Frame" and the "Inertial Frame", data is synchronously collected for both systems during the time the club is in the field of view of the camera system. The data from the inertial system is converted to rotation and translation in the "Inertial Frame" as a function of time using the technique of Dead Reckoning as is well understood to those in the art. Synchronous to the Inertial Navigation System the camera system has collected rotation and translation data as a function of time for the Club Face Frame. The synchronous data collected is now used to find a transformation matrix between the two systems. The transformation matrix is found by using standard techniques to solve an overdefined system of equations as is well known to those skilled in the art.

Once the transformation matrix is found then the inertial navigation data can be used to calculate the club face position at any point during the swing regardless of whether the markers are in the field of view. Additionally, if the inertial navigation system is placed with a known distance from the axis of the shaft and with generally know rotational orientation relative to the club face (i.e. clipped 20 mm from the axis of the shaft with a typical orientation such as twelve o'clock from the users golfers perspective when the club is squared at address) or is located axially with the shaft then the system can compute the shaft position relative to the club face. With this fully established relationship between these coordinate frames the system can display an accurate model of the club throughout the entire swing.

The above description of the disclosed example embodiments is provided to enable any person skilled in the art to make or use the invention. Various modifications to these example embodiments will be readily apparent to those skilled in the art, and the generic principles described herein can be applied to other example embodiments without departing from the spirit or scope of the invention. Thus, it is to be understood that the description and drawings presented herein represent a presently preferred example embodiment of the invention and are therefore representative of the subject matter which is broadly contemplated by the present invention. It is further understood that the scope of the present invention fully encompasses other example embodiments that may become obvious to those skilled in the art and that the scope of the present invention is accordingly limited by nothing other than the appended claims.

The invention claimed is:

1. A system for measuring a golf club head during an impact with a golf ball, the club head having a club face with at least one score line, wherein the club face is substantially planar, the system comprising:
   at least three markers placed on the club face, the marker placement adapted to (1) define the geometry of the club face, and (2) conform to a known tolerance of relative spacing and orientation between the markers, wherein at least two of the markers define a HEEL-TOE line that is parallel to the score line and at least one marker is not placed in alignment with the HEEL-TOE line;
   at least two cameras positioned ahead of the golf ball and adapted to capture a plurality of images prior to and at impact of the markers during a swing and communicating those images to a processor;
   the processor configured to perform the following steps;
   a. performing threshold processing on the images to detect pixels that may correspond to the markers;
   b. determining a position for the markers in three dimensional space;
   c. finding a group of markers that fall within the tolerance of a known geometric relationship based on the planarity of club face and the known orientation of the at least two markers along the HEEL-TOE line and the at least one marker not placed in alignment with the HEEL-TOE line;
d. labeling the markers based on their position with respect to the known geometric relationship; and
e. calculating the position of the club head during the swing based on the 3D position of the markers.

2. The system of claim 1, further comprising:
at least four markers placed on the club face, wherein the four markers are placed at the TOE TOP, TOE, TOE BOTTOM and HEEL positions of the club face and wherein D1 is defined as a line connecting the HEEL and TOE markers, D2 is a line connecting the TOE TOP and TOE markers, and D3 is a line connecting the TOE BOTTOM to TOE markers; and
wherein known tolerance of relative spacing and orientation between the markers comprises:
  i. D1 has and minimum and maximum known lengths for standard golf clubs;
  ii. D1 is always longer than D2 and D3;
  iii. D1 is substantially closer to horizontal relative to the ground than vertical at impact with a golf ball;
  iv. the TOE TOP marker is above D1 at impact;
  v. the TOE BOTTOM marker is below D1 at impact; and
  vi. all markers lie substantially in the same plane.

3. The system of claim 1, wherein the processor performs the following additional steps:
  f. identifying groups of neighboring pixels found in step (a); and
  g. performing a centroid algorithm on pixels groups detected in step (f); and
  h. stereoscopically matching the centroids detected in step (g).

4. The system of claim 1, wherein the processor performs the following additional step of determining the position of the golf ball in three dimensional space before impact.

5. The system of claim 4, the system further comprising an alerting structure connected to the processor, wherein the alerting structure produces an alert when the processor determines the position of the golf ball.

6. The system of claim 4, wherein the processor performs the following additional step of determining the point on the club face where the club face first contacts the ball.

7. The system of claim 1, wherein a plurality of club heads having club faces are marked, the processor performs the following additional steps of:
  f. measuring and storing a list of the precise geometric layout of the markers on each of the plurality of golf club heads;
  g. locating the geometric layout from the plurality of images for the club head that is being swung; and
  h. identifying which golf club head in the plurality is being swung based on a match of the located geometric layout of step (g) to the stored geometric layout.

8. The system of claim 1 wherein the club face is part of a golf club, the system further comprising:
an inertial navigation system connected to the golf club and adapted to capture inertial data during the swing and communicate the data to the processor; and
the processor performs the following additional steps:
  f. converting the inertial data to rotation and translation values of an inertial coordinate frame;
  g. converting the club face position data of step (e) to rotation and translation values of a club face coordinate frame; and
  h. determining a relationship between the inertial coordinate frame and the club face coordinate frame.

9. The system of claim 8, wherein the relationship in step (h) is determined by using a method for solving an overdefined system of equations.

10. The system of claim 8, wherein the relationship between the club face coordinate frame and the inertial coordinate frame is used to calculate the club face position and orientation when at least one of the markers is not in the field of view of the cameras.

11. The system of claim 8, wherein the golf club has a club shaft with a shaft axis, and the processor performs the following additional step of calculating the position of the club shaft based on a known relationship between the inertial navigation system and the shaft axis.

12. The system of claim 11, wherein the system displays a 3D model of the golf club throughout at least a portion of the swing.

13. The system of claim 12, wherein the portion of the swing modeled does not correspond to a portion of the swing that was captured by the cameras.

14. The system of claim 1, wherein the processor performs the following additional step of calculating a club face attribute selected from a group consisting of: club swing path, club speed and club face orientation.

15. The system of claim 4, wherein the processor performs the following additional step of calculating the time at which the club face first contacts the golf ball and further calculates a club face attribute at the time of impact selected from a group consisting of: club swing path, club speed, club face orientation and point of impact on the club face.

16. The system of claim 14, further comprising a display connected to the processor, the display adapted to display the club face attribute.

17. The system of claim 1, further comprising:
a tilt sensor adapted to measure the position of the at last two cameras relative to earth tangential and communicate tilt data to the processor; and
the processor performs the following additional step of using the tilt data to refine the calculation of step (e).

18. The system of claim 1, wherein the golf club head, a golf club hosel connected to the club head or a shaft connected to the club head further comprises additional markers, and the processor performs the following additional step of:
  f. identifying the additional markers from the plurality of images;
  g, calculating and storing the geometric relationship between the additional markers and the markers found in step (d) and;
  h. calculating the position of any marker that is occluded based on the geometric relationship to the markers that are visible; and
  i. step (e) further comprises using the location position from step (h) to calculate the position of the club head during the swing.

19. The system of claim 1, wherein the markers are retroreflective.

20. The system of claim 1, wherein the markers have a center with a contrasting concentric ring.

21. A method of measuring the orientation of a golf club head during a and impact with a golf ball, the golf club head having a club face with at least one score line, wherein the club face is substantially planar, the method comprising:
  a. applying at least three markers placed on the club face, the marker placement is such that (1) the markers define the geometry of the club face, and (2) the markers' relative spacing and orientation to each other are within a known tolerance, wherein at least two of the markers define HEEL-TOE line that is parallel to the score line and at least one marker is not placed in alignment with the HEEL-TOE line;
b. capturing a plurality of images from at least two cameras of the golf club face during a swing and at impact;
c. performing threshold processing on the images to detect pixels that may correspond to the markers;
d. determining a position for the markers in three dimensional space;
e. finding a group of markers that fall within the tolerance of a known geometric relationship based on the planarity of the club face and the known orientation of the at least two markers along the HEEL-TOE line and the at least one marker not placed in alignment with the HEEL-TOE line;
f. labeling the markers based on their position with respect to the known geometric relationship; and
g. calculating the position of the club head during the swing based on the 3D position of the markers.

22. The method of claim 21, further comprising the steps of:
h. identifying groups of neighboring pixels found in step (c);
i. performing a centroid algorithm on pixels groups detected in step (h); and
j. stereoscopically matching the centroids detected in step (i).

23. The method of claim 21, wherein:
step (a) comprises applying four markers are placed at the TOE TOP, TOE, TOE BOTTOM and HEEL positions of the club face and wherein D1 is defined as a line connecting the HEEL and TOE markers, D2 is a line connecting the TOE TOP and TOE markers, and D3 is a line connecting the TOE BOTTOM to TOE markers; and
wherein known tolerance of relative spacing and orientation between the markers comprises:
i. D1 has and minimum and maximum known lengths for standard golf clubs;
ii. D1 is always longer than D2 and D3;
iii. D1 is substantially closer to horizontal relative to the ground than vertical at impact with a golf ball;
iv. the TOE TOP marker is above D1 at impact;
v. the TOE BOTTOM marker is below D1 at impact; and
vi. all markers lie substantially in the same plane.

24. The method of claim 21, wherein step (a) comprises applying additional markers to the golf club head, a golf club hosel connected to the club head or a shaft connected to the club head further comprises additional markers, and the method further comprising the steps of:
h. identifying the additional markers from the plurality of images;
i. calculating and storing the geometric relationship between the additional markers and the markers found in step (f) and;
j. calculating the position of any marker that is occluded based on the geometric relationship to the markers that are visible; and
k. step (g) further comprises using the location position from step (j) to calculate the position of the club head during the swing.

* * * * *